United States Patent
Haag et al.

(10) Patent No.: US 8,249,824 B2
(45) Date of Patent: Aug. 21, 2012

(54) ANALYTICAL BANDWIDTH ENHANCEMENT FOR MONITORING TELEMETRIC SIGNALS

(75) Inventors: Stanley P. Haag, Highlands Ranch, CO (US); Anton A. Bougaev, La Jolla, CA (US); Aleksey M. Urmanov, San Diego, CA (US); Steven F. Zwinger, Poway, CA (US); Kenny C. Gross, San Diego, CA (US)

(73) Assignee: Oracle America, Inc., Redwood Shores, CA (US)

( * ) Notice: Subject to any disclaimer, the term of this patent is extended or adjusted under 35 U.S.C. 154(b) by 564 days.

(21) Appl. No.: 12/494,903

(22) Filed: Jun. 30, 2009

(65) Prior Publication Data

US 2010/0332185 A1    Dec. 30, 2010

(51) Int. Cl.
*G06F 19/00*    (2011.01)
(52) U.S. Cl. ........................................................ 702/179

(58) Field of Classification Search .................... 702/57, 702/58, 64, 65, 69, 74–76, 83, 90, 99, 127, 702/179, 183, 189, 191, 195
See application file for complete search history.

(56) References Cited

U.S. PATENT DOCUMENTS

2007/0179367 A1*    8/2007    Ruchti et al. .................. 600/310
* cited by examiner

*Primary Examiner* — Mohamed Charioui
(74) *Attorney, Agent, or Firm* — Park, Vaughan, Fleming & Dowler LLP; Chia-Hsin Suen

(57) ABSTRACT

Some embodiments provide a system that analyzes telemetry data from a monitored system. During operation, the system obtains the telemetry data as a set of telemetric signals from the monitored system and groups the telemetry data into one or more clusters of correlated telemetric signals from the telemetric signals. Next, the system increases a bandwidth associated with monitoring the telemetric signals. To increase the bandwidth, the system omits one or more of the correlated telemetric signals from each of the clusters during sampling of the telemetric signals and estimates the omitted correlated telemetric signals by applying a nonlinear, nonparametric regression technique to the sampled telemetric signals.

20 Claims, 5 Drawing Sheets

US 8,249,824 B2

ANALYTICAL BANDWIDTH ENHANCEMENT FOR MONITORING TELEMETRIC SIGNALS

BACKGROUND

1. Field

The present embodiments relate to techniques for analyzing telemetry data. More specifically, the present embodiments relate to a method and system for enhancing bandwidth associated with sampling telemetric signals from a monitored system.

2. Related Art

As electronic commerce becomes more prevalent, businesses are increasingly relying on enterprise computing systems to process ever-larger volumes of electronic transactions. A failure in one of these enterprise computing systems can be disastrous, potentially resulting in millions of dollars of lost business. More importantly, a failure can seriously undermine consumer confidence in a business, making customers less likely to purchase goods and services from the business. Hence, it is important to ensure high availability in such enterprise computing systems.

To achieve high availability, it is necessary to be able to capture unambiguous diagnostic information that can quickly locate faults in hardware or software. If systems perform too little event monitoring, when a problem crops up at a customer site, service engineers may be unable to quickly identify the source of the problem. This can lead to increased down time.

Fortunately, high-end computer servers are now equipped with a large number of sensors that measure physical performance parameters such as temperature, voltage, current, vibration, and acoustics. Software-based monitoring mechanisms also monitor software-related performance parameters, such as processor load, memory and cache usage, system throughput, queue lengths, I/O traffic, and quality of service. Typically, special software analyzes the collected telemetry data and issues alerts when there is an anomaly. In addition, it is important to archive historical telemetry data to allow long-term monitoring and to facilitate detection of slow system degradation.

Moreover, an increase in the number of components within computer servers has resulted in an increase in sensor density within the computer servers. For example, thousands of sensors may be used to monitor the various components of a large computer server. Dynamic monitoring techniques for computer servers may further require that each sensor be sampled at or above a certain rate. In turn, the use of additional sensors to collect telemetry data at high sampling rates has resulted in higher bandwidth demands associated with sampling the telemetry data.

However, system buses that collect and transmit the telemetry data typically have bandwidth limitations that prevent the telemetry data from being sampled beyond a certain rate. For example, telemetry data collected using an Inter-Integrated Circuit ($I^2C$) system bus may be limited to 3.4 megabits per second. As a result, an increase in sensor density within a computer server may cause the sampling rate of one or more sensors to fall. For example, a computer server with an $I^2C$ system bus and thousands of sensors may be so bandwidth-limited that each sensor may only be sampled once a minute or longer. Dynamic monitoring and integrity analysis techniques that require frequent sampling of sensors may thus be impeded by such slow sampling rates.

Hence, what is needed is a technique for increasing the bandwidth associated with collecting telemetry data in monitored computer systems.

SUMMARY

Some embodiments provide a system that analyzes telemetry data from a monitored system. During operation, the system obtains the telemetry data as a set of telemetric signals from the monitored system and groups the telemetry data into one or more clusters of correlated telemetric signals from the telemetric signals. Next, the system increases a bandwidth associated with monitoring the telemetric signals. To increase the bandwidth, the system omits one or more of the correlated telemetric signals from each of the clusters during sampling of the telemetric signals and estimates the omitted correlated telemetric signals by applying a nonlinear, nonparametric regression technique to the sampled telemetric signals.

In some embodiments, omitting one or more of the correlated telemetric signals from each of the clusters involves sampling a subset of the correlated telemetric signals from each of the clusters using a round-robin technique.

In some embodiments, grouping the telemetry data into one or more clusters of correlated telemetric signals involves identifying a cross-predictability measure associated with each telemetric signal from the telemetric signals using a cross-correlation analysis technique and creating the clusters based on the cross-predictability measure.

In some embodiments, the cross-predictability measure corresponds to a prediction error associated with the telemetric signal.

In some embodiments, the telemetric signal is continuously sampled at a high sampling rate if the prediction error is high.

In some embodiments, the nonlinear, nonparametric regression technique corresponds to a multivariate state estimation technique (MSET).

In some embodiments, the monitored system corresponds to a computer system.

In some embodiments, the telemetric signals from the computer system include at least one of a load metric, a CPU utilization, an idle time, a memory utilization, a disk activity, a transaction latency, a temperature, a voltage, a fan speed and a current.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
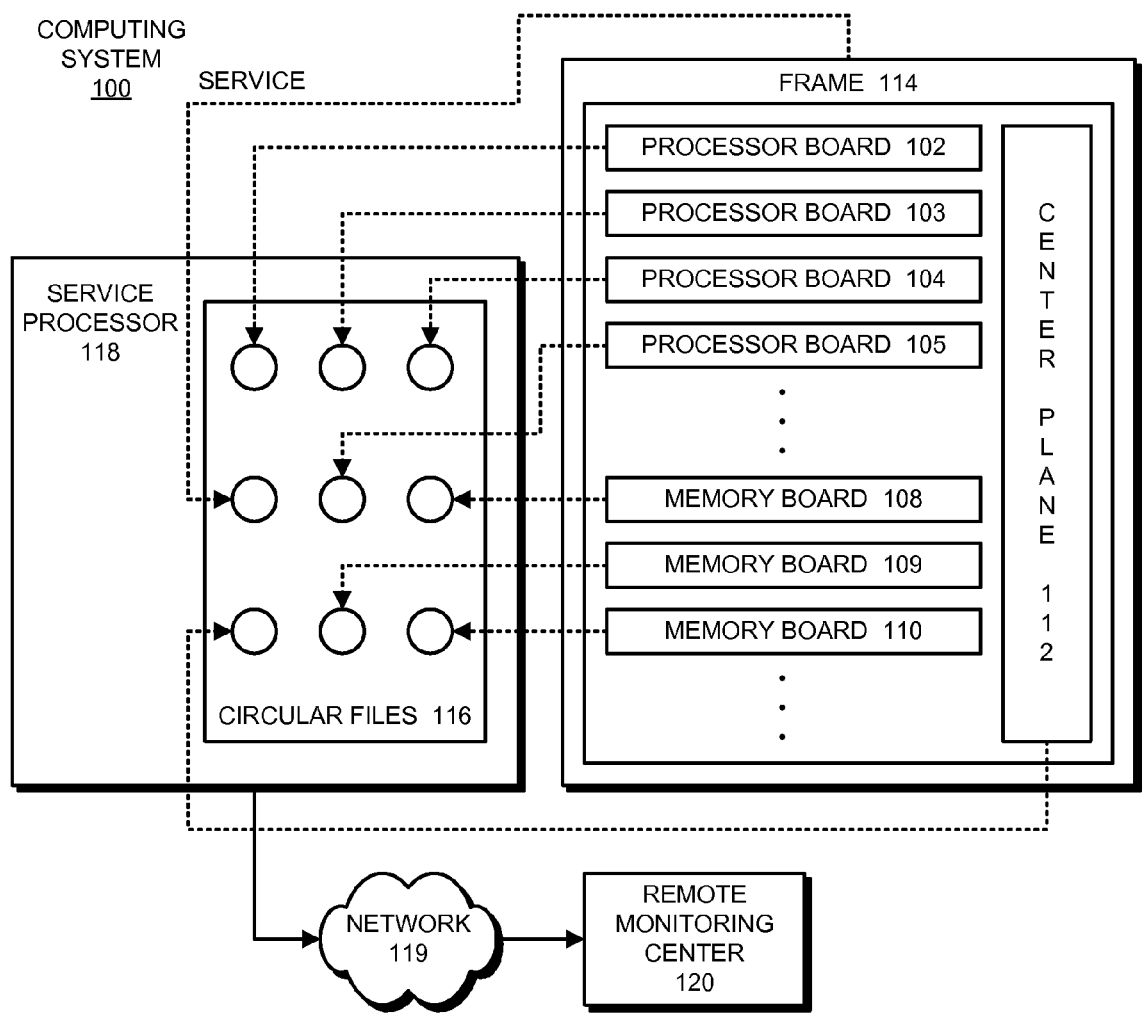
FIG. 1 shows a computer system which includes a service processor for processing telemetry signals in accordance with an embodiment.

FIG. 1 shows a computer system which includes a service processor for processing telemetry signals in accordance with an embodiment. As is illustrated in FIG. 1, computer system 100 includes a number of processor boards 102-105 and a number of memory boards 108-110, which communicate with each other through center plane 112. These system components are all housed within a frame 114.

In one or more embodiments, these system components and frame 114 are all "field-replaceable units" (FRUs), which are independently monitored as is described below. Note that all major system units, including both hardware and software, can be decomposed into FRUs. For example, a software FRU can include an operating system, a middleware component, a database, or an application.

Computer system 100 is associated with a service processor 118, which can be located within computer system 100, or alternatively can be located in a standalone unit separate from computer system 100. For example, service processor 118 may correspond to a portable computing device, such as a mobile phone, laptop computer, personal digital assistant (PDA), and/or portable media player. Service processor 118 may include a monitoring mechanism that performs a number of diagnostic functions for computer system 100. One of these diagnostic functions involves recording performance parameters from the various FRUs within computer system 100 into a set of circular files 116 located within service processor 118. In one embodiment of the present invention, the performance parameters are recorded from telemetry signals generated from hardware sensors and software monitors within computer system 100. In one or more embodiments, a dedicated circular file is created and used for each FRU within computer system 100. Note that this circular file can have a three-stage structure as is described below with reference to FIG. 2.

The contents of one or more of these circular files 116 can be transferred across network 119 to remote monitoring center 120 for diagnostic purposes. Network 119 can generally include any type of wired or wireless communication channel capable of coupling together computing nodes. This includes, but is not limited to, a local area network (LAN), a wide area network (WAN), a wireless network, and/or a combination of networks. In one or more embodiments, network 119 includes the Internet. Upon receiving one or more circular files 116, remote monitoring center 120 may perform various diagnostic functions on computing system 100, as described below with respect to FIGS. 2-3. The system of FIG. 1 is described further in U.S. Pat. No. 7,020,802 (issued Mar. 28, 2006), by inventors Kenny C. Gross and Larry G. Votta, Jr., entitled "Method and Apparatus for Monitoring and Recording Computer System Performance Parameters," which is incorporated herein by reference.

Figure 2:
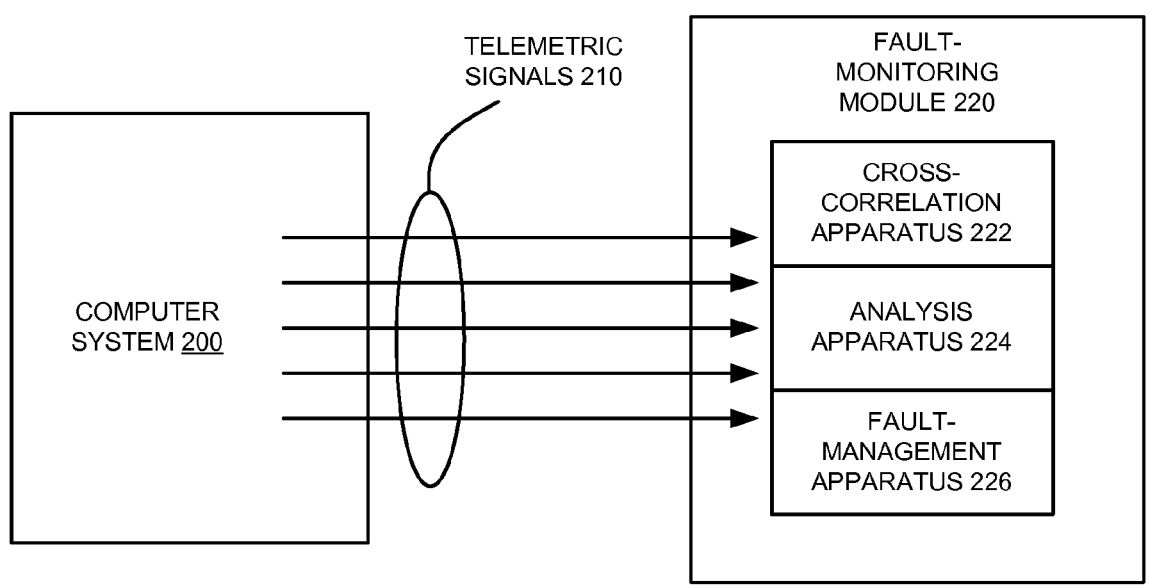
FIG. 2 shows a telemetry data archiving system which records both short-term, real-time telemetry data and long-term, historical telemetry data in accordance with an embodiment.

FIG. 2 illustrates a telemetry analysis system which examines both short-term real-time telemetry data and long-term historical telemetry data in accordance with an embodiment. As shown in FIG. 2, computer system 200 is monitored using a number of telemetric signals 210 (e.g., load metric, CPU utilization, idle time, memory utilization, disk activity, transaction latency, temperature, voltage, fan speed, current, etc.), which are transmitted to a fault-monitoring module 220. Fault-monitoring module 220 analyzes telemetric signals 210 and issues alerts when there is an anomaly.

Fault-monitoring module 220 may be provided by and/or implemented using a service processor associated with computer system 200. Alternatively, fault-monitoring module 220 may reside within a remote monitoring center (e.g., remote monitoring center 120 of FIG. 1) that obtains telemetric signals 210 from computer system 200 over a network connection. Moreover, fault-monitoring module 220 may include functionality to analyze both real-time telemetry signals 210 and long-term historical telemetry data. For example, fault-monitoring module 220 may be used to detect anomalies in telemetric signals 210 received directly from computer system 200 and/or other monitored computer systems. Fault-monitoring module 220 may also be used in offline detection of anomalies from computer system 200 and/or other monitored computer systems by processing archived and/or compressed telemetry data associated with the monitored computer system(s).

Those skilled in the art will appreciate that the overall sampling rate of telemetric signals 210 may drop as the number of sensors in computer system 200 increases. In particular, telemetric signals 210 may be collected from computer system 200 using a system bus on computer system 200. However, as an increasing number of sensors are used to collect telemetric signals 210, the overall sampling rate associated with the sensors may drop due to bandwidth limitations on the system bus. For example, a computer server may contain thousands of sensors and an Inter-Integrated Circuit ($I^2C$) system bus for collecting telemetric signals 210 from the sensors. While the sensor density of the computer server may be significantly higher than the sensor density of a computer server that is several years older, the bandwidth of the $I^2C$ system bus may not have increased in more than a decade. Consequently, each sensor may only be sampled once a minute or longer.

Such slowdowns in sampling rates of sensors may further reduce the accuracy and robustness of fault-monitoring module 220. In particular, techniques used by fault-monitoring module 220 to dynamically and comprehensively monitor computer system 200 may require frequent sampling of telemetric signals 210. However, reduced sampling rates associated with high sensor density on computer system 200 may not allow telemetric signals 210 to be sampled at a rate that is optimal for analysis by fault-monitoring module 220, resulting in an increase in false alarms, missed alarms, and/or other issues that may adversely affect the efficacy of fault-monitoring module 220.

To mitigate bandwidth limitations associated with monitoring telemetric signals 210 from computer system 200, fault-monitoring module 220 may include functionality to analytically enhance the bandwidth associated with monitoring telemetric signals 210. As discussed below, such analytical bandwidth enhancement may be accomplished by omitting some telemetric signals 210 during sampling and estimating the omitted telemetric signals using sampled telemetric signals with which the omitted telemetric signals are correlated.

As shown in FIG. 2, fault-monitoring module 220 includes a cross-correlation apparatus 222, an analysis apparatus 224, and a fault-management apparatus 226. In general, cross-correlation apparatus 222 may be used to identify correlations between groups of telemetric signals 210 from computer system 200. To determine the correlations, cross-correlation apparatus 222 may identify a cross-predictability measure for each telemetric signal using a cross-correlation analysis technique. The cross-predictability measure may then be used to group telemetric signals 210 into one or more clusters of correlated telemetric signals.

After the clusters of correlated telemetric signals 210 are formed, analysis apparatus 224 may increase the bandwidth associated with monitoring telemetric signals 210 by omitting one or more telemetric signals from each cluster during sampling of telemetric signals 210. For example, analysis apparatus 224 may omit one of three telemetric signals in a cluster during polling of the telemetric signals using a system bus on computer system 200. As a result, analysis apparatus 224 may effectively boost the bandwidth associated with monitoring the cluster of three telemetric signals by 50% by sampling two of the telemetric signals during a given sampling interval and estimating the third telemetric signal using the two sampled telemetric signals.

To estimate the omitted telemetric signals, analysis apparatus 224 may apply a nonlinear, nonparametric regression technique to the sampled telemetric signals. In one or more embodiments, analysis apparatus 224 applies a multivariate state estimation technique (MSET) to the sampled telemetric signals to estimate the omitted telemetric signals. In other words, analysis apparatus 224 may use MSET to generate estimates of the omitted telemetric signals based on the current set of sampled telemetric signals 210 obtained from computer system 200.

The sampled and/or estimated telemetric signals may then be used by fault-management apparatus 226 to detect anomalies in computer system 200, analyze degradation modes in computer system 200, and/or address faults in computer system 200. For example, fault-management apparatus 226 may identify a fault in computer system 200 by analyzing both sampled and estimated telemetric signals 210 using MSET. Fault-management apparatus 226 may then correct the fault by facilitating the replacement of a degrading component or sensor and/or by generating replacement signals in lieu of a sensor's faulty telemetric signals to maintain normal operation in computer system 200.

In one or more embodiments, the nonlinear, nonparametric regression technique used by analysis apparatus 224 may refer to any number of pattern recognition algorithms. For example, see [Gribok] "Use of Kernel Based Techniques for Sensor Validation in Nuclear Power Plants," by Andrei V. Gribok, J. Wesley 20 Hines, and Robert E. Uhrig, The Third American Nuclear Society International Topical Meeting on Nuclear Plant Instrumentation and Control and Human-Machine Interface Technologies, Washington D.C., Nov. 13-17, 2000. This paper outlines several different pattern recognition approaches. Hence, the term "MSET" as used in this specification can refer to (among other things) any of 25 techniques outlined in [Gribok], including Ordinary Least Squares (OLS), Support Vector Machines (SVM), Artificial Neural Networks (ANNs), MSET, or Regularized MSET (RMSET).

More specifically, the cross-predictability measure for each telemetric signal obtained by cross-correlation apparatus 222 may correspond to a prediction error associated with the telemetric signal. The prediction error may represent a cross-correlation between the telemetric signal and one or more other telemetric signals 210 from computer system 200. In particular, the prediction error may represent the ability of analysis apparatus 224 to predict the value of the telemetric signal (e.g., using MSET) based on the sampled values of other telemetric signals 210 from computer system 200. As a result, a telemetric signal with a high prediction error (e.g., 0.8 and greater) may have a low cross-predictability with other telemetric signals, while a telemetric signal with a low prediction error (e.g., 0.2 or less) may have a high cross-predictability with other telemetric signals.

Furthermore, the functionality of cross-correlation apparatus 222 may be implemented during the training stage of MSET. In particular, the training stage of MSET may involve building a model of computer system 200 using historical telemetry data from computer system 200 and/or similar monitored computer systems. The historical telemetry data may be used to determine correlations among various telemetric signals 210 collected from the monitored computer system(s) and to enable accurate estimates of each telemetric signal based on the correlations between telemetric signals 210. As a result, the cross-predictability measure (e.g., prediction error) for each telemetric signal may also be calculated during the training stage and used by cross-correlation apparatus 222 to group telemetric signals 210 into well-correlated clusters.

In one or more embodiments, cross-correlation apparatus 222 groups telemetric signals with low prediction errors into clusters of well-correlated telemetric signals that are then used by analysis apparatus 224 to analytically enhance the bandwidth associated with monitoring telemetric signals 210. For example, telemetric signals obtained using voltage, temperature, and current sensors in computer system 200 may be well correlated with one another and grouped into a cluster by cross-correlation apparatus 222. Analysis apparatus 224 may increase bandwidth associated with monitoring the cluster by omitting one or more voltage, temperature, and current signals during sampling of the cluster and estimating the omitted signals using the sampled signals in the cluster.

However, fault-monitoring module 220 may be unable to perform analytical bandwidth enhancement for telemetric signals with a high prediction error using cross-correlations for the telemetric signals. As a result, telemetric signals with a high prediction error may be continuously sampled at a high sampling rate because these telemetric signals cannot be accurately estimated using other telemetric signals. Alternatively, fault-monitoring module 220 may conserve bandwidth associated with these telemetric signals by sampling the telemetric signals intermittently, randomly, and/or based on the importance of each telemetric signal. For example, high sampling rates may only be used for telemetric signals with high prediction errors if the telemetric signals are critical to detecting imminent failure in computer system 200.

In one or more embodiments, analysis apparatus 224 omits correlated telemetric signals from each cluster by sampling a subset of the correlated telemetric signals using a round-robin technique. For example, a cluster may have four well-correlated telemetric signals. To boost bandwidth, analysis apparatus 224 may omit one telemetric signal from the cluster during each sampling interval. Furthermore, analysis apparatus 224 may cycle through the telemetric signals using a sampling pattern that omits the first telemetric signal, then the second telemetric signal, then the third telemetric signal, and finally the fourth telemetric signal. Analysis apparatus 224 may continually repeat this round-robin pattern of omitting telemetric signals during sampling so that all telemetric signals in the cluster are sampled and omitted with equal and regular frequency.

Those skilled in the art will appreciate that telemetric signals 210 may be clustered and sampled by fault-monitoring module 220 in a variety of ways. For example, telemetric signals 210 may be divided into clusters that range in size from two telemetric signals to the total number of telemetric signals 210 monitored in computer system 200 by fault-monitoring module 220. Moreover, telemetric signals within each cluster may be omitted one at a time or in larger numbers (e.g., two at a time, three at a time, etc.). The pattern of omitting telemetric signals from each cluster may also vary. For example, a telemetric signal with the lowest prediction error and/or most unimportant value may be omitted more frequently than other telemetric signals in the same cluster.

Consequently, fault-monitoring module 220 may enable analytical bandwidth enhancement in monitoring telemetric signals 210 from computer system 200. The enhanced bandwidth may increase effective sampling rates of telemetric signals 210 within standard system bus architectures (e.g., $I^2C$), even as more sensors are used to obtain telemetric signals 210. The increased sampling rates may further facilitate dynamic integrity analysis, fault detection, and/or other monitoring of computer system 200 by fault-monitoring module 220.

The functionality of fault-monitoring module 220 may additionally be used to monitor and analyze telemetric signals from a variety of monitored systems. For example, fault-monitoring module 220 may be configured to analyze telemetric signals from nuclear plants, avionics systems, machines, and/or other types of engineering systems.

Figure 3:
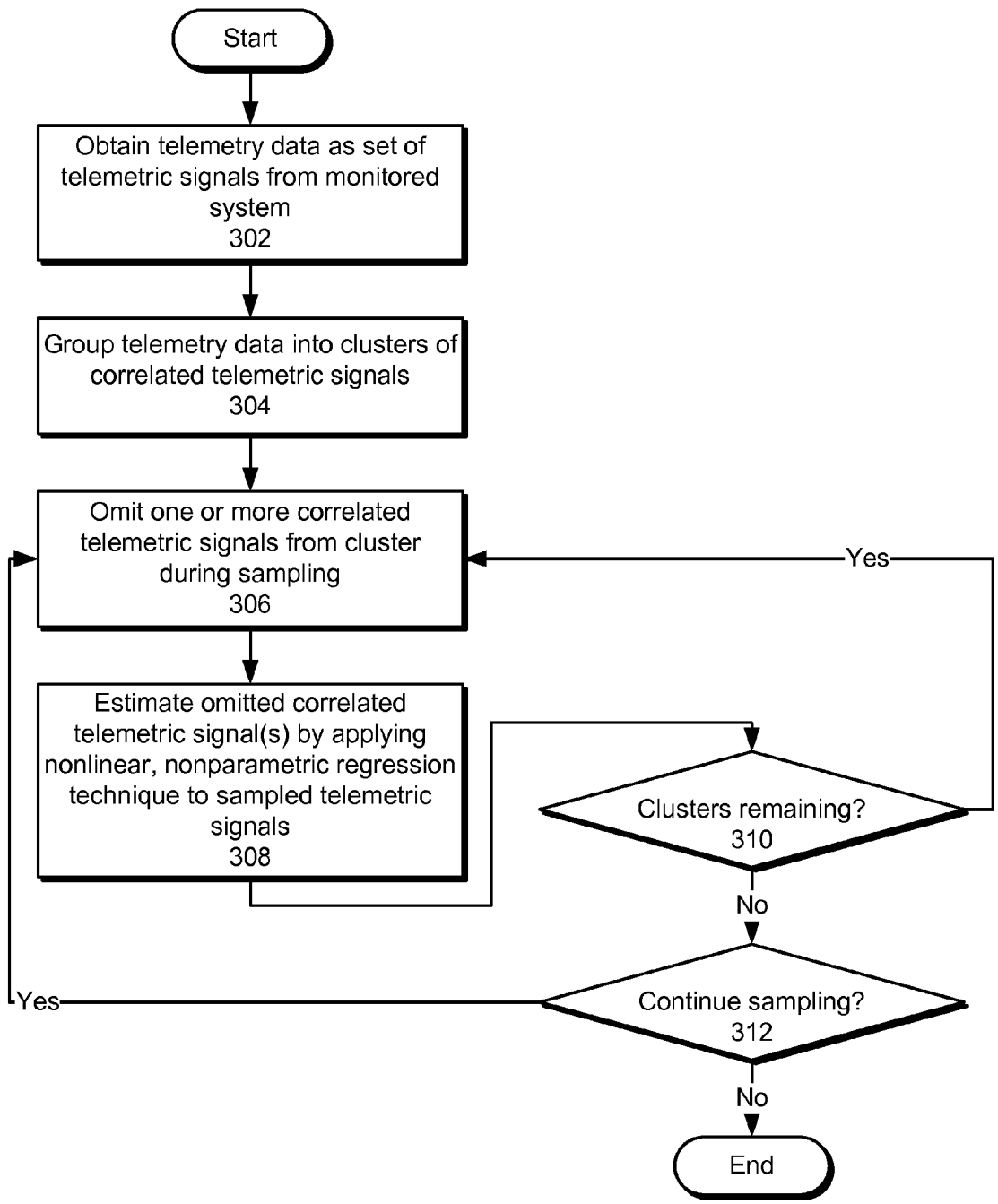
FIG. 3 shows a flowchart illustrating the process of analyzing telemetry data from a monitored system in accordance with an embodiment.

FIG. 3 shows a flowchart illustrating the process of analyzing telemetry data from a monitored system in accordance with an embodiment. In one or more embodiments, one or more of the steps may be omitted, repeated, and/or performed in a different order. Accordingly, the specific arrangement of steps shown in FIG. 3 should not be construed as limiting the scope of the technique.

Initially, telemetry data is obtained as a set of telemetric signals from a monitored system (operation 302). For example, the telemetry data may include sensor measurements of load metric, CPU utilization, idle time, memory utilization, disk activity, transaction latency, temperature, voltage, fan speed, current, and/or other telemetric signals from a monitored computer system. On the other hand, the telemetry data may correspond to telemetric signals measured from an engineering system such as a nuclear plant, an avionics system, and/or a machine.

Next, the telemetry data is grouped into clusters of correlated telemetric signals (operation 304). Each cluster may contain as few as two telemetric signals and as many as the total number of telemetric signals obtained from the monitored system. The grouping of correlated telemetric signals into clusters is described in further detail below with respect to FIG. 4.

During sampling of the telemetric signals, one or more telemetric signals are omitted from a cluster (operation 306). For example, one telemetric signal may be omitted from each cluster during each sampling interval of the telemetric signals. Furthermore, the pattern of omission may follow a round-robin technique that cycles through the telemetric signals in the cluster. As a result, telemetric signals in the cluster may be omitted with equal and regular frequency. Alternatively, telemetric signals in a cluster may be omitted from sampling based on importance, predictability, and/or other criteria. For example, a telemetric signal that carries information that is unimportant to fault detection in the monitored system may be omitted more frequently than a telemetric signal that carries information that is relevant to the fault detection in the monitored system.

Next, the omitted correlated telemetric signals are estimated by applying a nonlinear, nonparametric regression technique to the sampled telemetric signals (operation 308). As described above, the nonlinear, nonparametric regression technique may correspond to MSET and/or another statistical analysis or pattern recognition technique. The nonlinear, nonparametric regression technique may leverage cross-correlations between telemetric signals in the cluster to accurately estimate the omitted telemetric signal(s). The nonlinear, nonparametric regression technique may also increase the bandwidth (e.g., sampling rate) associated with monitoring the telemetric signals. For example, the effective sampling rate in a cluster of three telemetric signals may be boosted by 50% if two telemetric signals are sampled and one telemetric signal is omitted and estimated during each sampling interval.

The omission and estimation of telemetric signals (operations 306-308) is repeated if additional clusters remain to be sampled (operation 310) in the monitoring system. For example, operations 306-308 may be performed for each of five clusters of correlated telemetric signals in the monitored system. Operations 306-308 may also be repeated if the telemetric signals continue to be sampled (operation 312). For example, one or more telemetric signals may be omitted and estimated (operations 306-308) from each cluster during each sampling interval of the telemetric signals. In other words, the increased bandwidth associated with monitoring the telemetric signals may be provided as long as the telemetric signals are sampled from the monitored system.

Figure 4:
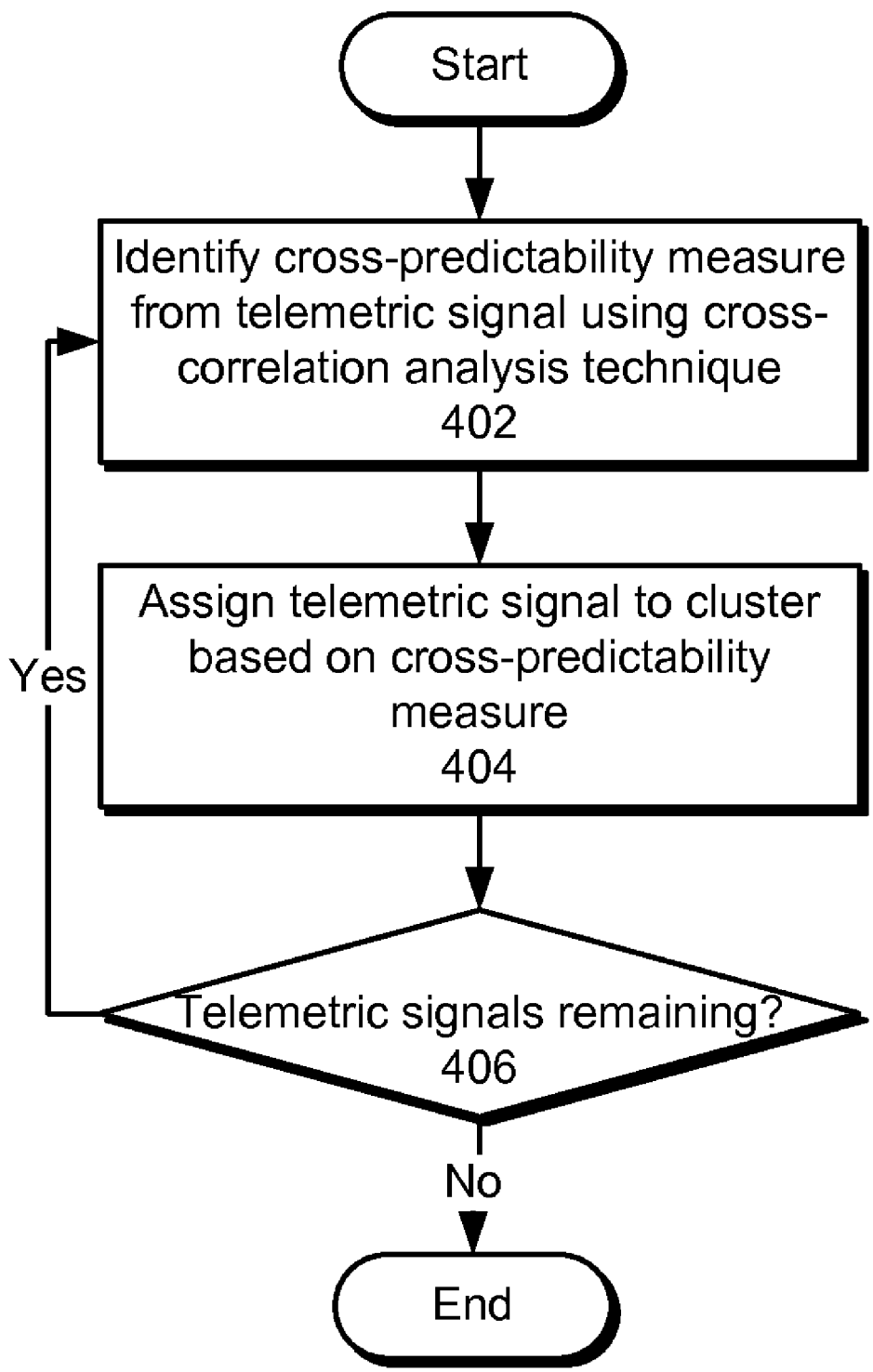
FIG. 4 shows a flowchart illustrating the process of grouping telemetry data into one or more clusters of telemetric signals in accordance with an embodiment.

FIG. 4 shows a flowchart illustrating the process of grouping telemetry data into one or more clusters of telemetric signals in accordance with an embodiment. In one or more embodiments, one or more of the steps may be omitted, repeated, and/or performed in a different order. Accordingly, the specific arrangement of steps shown in FIG. 4 should not be construed as limiting the scope of the technique.

To group the telemetry data, a cross-predictability measure may be identified from each telemetric signal using a cross-correlation analysis technique (operation 402). The cross-predictability measure may be identified as a prediction error for the telemetric signal. In other words, the cross-predictability measure may correspond to a measure of the error involved in predicting the telemetric signal based on the values of other telemetric signals (e.g., using MSET).

The telemetric signal may then be assigned to a cluster based on the cross-predictability measure (operation 404).

For example, a telemetric signal with a low cross-predictability (e.g., high prediction error) with other telemetric signals may be assigned to a cluster that is sampled continuously at a high sampling rate. On the other hand, a telemetric signal with a high cross-predictability (e.g., low prediction error) with other telemetric signals may be assigned to a cluster containing the other telemetric signals. Clusters containing well-correlated telemetric signals may then be sampled using a round-robin technique to analytically boost bandwidth and/or the sampling rate associated with monitoring the clusters.

Operations 402-404 may be repeated if telemetric signals to be grouped into clusters remain (operation 406). For example, operations 402-404 may be repeated for each of hundreds or thousands of telemetric signals monitored in a computer system, such as computer system 200 of FIG. 2. Alternatively, operations 402-404 may be used to group telemetric signals from avionics systems, nuclear plants, machines, and/or other engineering systems into clusters of correlated telemetric signals.

Figure 5:
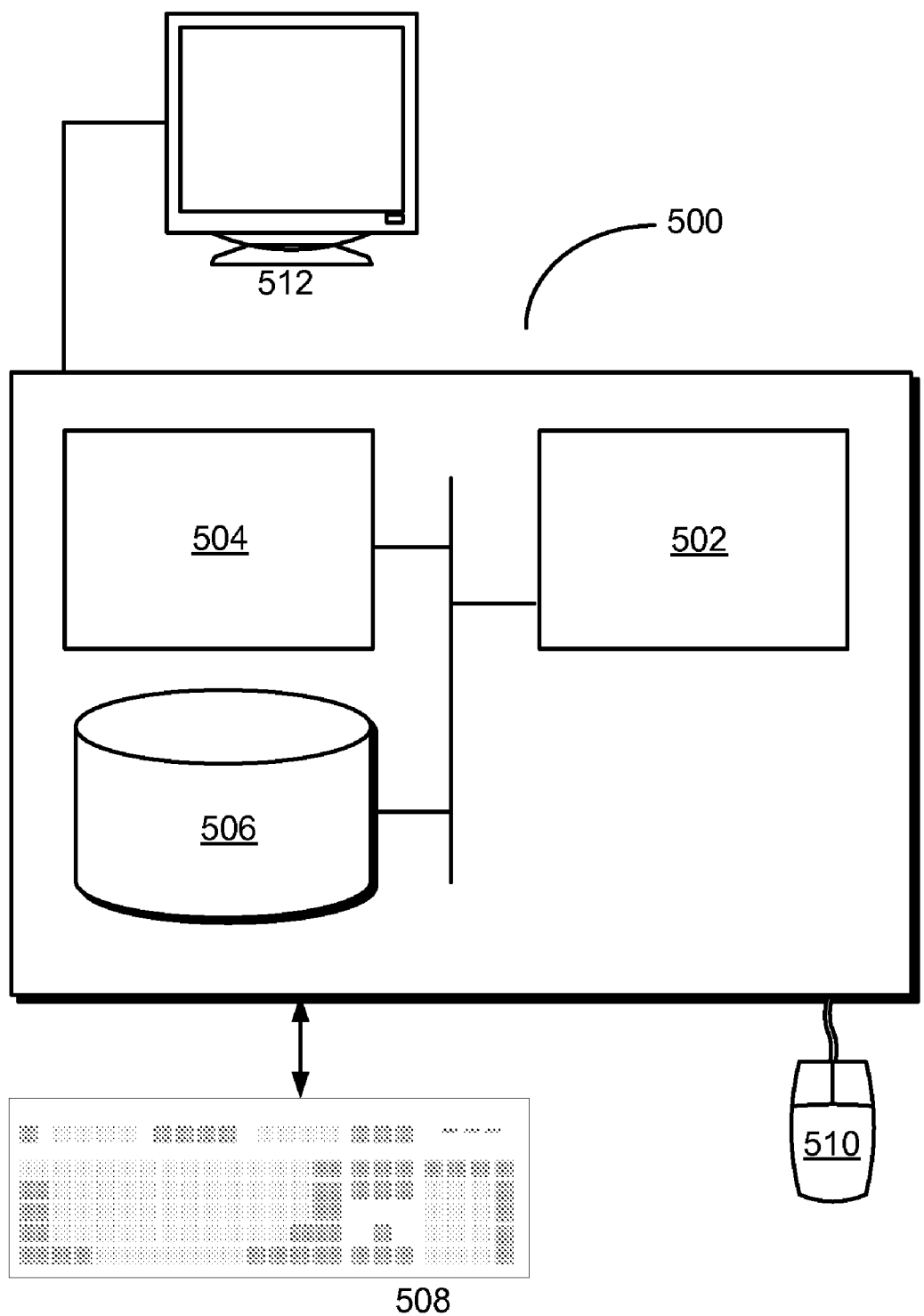
FIG. 5 shows a computer system.

FIG. 5 shows a computer system 500. Computer system 500 includes a processor 502, memory 504, storage 506, and/or other components found in electronic computing devices. Processor 502 may support parallel processing and/or multi-threaded operation with other processors in computer system 500. Computer system 500 may also include input/output (I/O) devices such as a keyboard 508, a mouse 510, and a display 512.

Computer system 500 may include functionality to execute various components of the present embodiments. In particular, computer system 500 may include an operating system (not shown) that coordinates the use of hardware and software resources on computer system 500, as well as one or more applications that perform specialized tasks for the user. To perform tasks for the user, applications may obtain the use of hardware resources on computer system 500 from the operating system, as well as interact with the user through a hardware and/or software framework provided by the operating system.

In one or more embodiments, computer system 500 implements a fault-monitoring module that analyzes telemetry data from a monitored system. The fault-monitoring module may include a cross-correlation apparatus that groups the telemetry data into one or more clusters of correlated telemetric signals. The fault-monitoring module may also include an analysis apparatus that increases a bandwidth associated with monitoring the telemetric signals. To increase bandwidth, the analysis apparatus may omit one or more correlated telemetric signals from each cluster during sampling of the telemetric signals and estimate the omitted correlated telemetric signals by applying a nonlinear, nonparametric regression technique to the sampled telemetric signals. Finally, the fault-monitoring module may include a fault-management apparatus that uses the sampled and/or estimated telemetric signals to detect anomalies, analyze degradation modes, and/or address faults in the monitored system.

In addition, one or more components of computer system 500 may be remotely located and connected to the other components over a network. Portions of the present embodiments (e.g., monitoring mechanism, fault-monitoring module, cross-correlation apparatus, analysis apparatus, fault-management apparatus, etc.) may also be located on different nodes of a distributed system that implements the embodiments. For example, the present embodiments may be implemented using a cloud computing system that provides a remote monitoring and analysis framework for a set of computer servers, avionics systems, nuclear power plants, and/or machines.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for analyzing telemetry data from a monitored system, comprising:
   in one or more computers, performing operations for:
      obtaining the telemetry data as a set of telemetric signals from the monitored system;
      grouping the telemetry data into one or more clusters of correlated telemetric signals from the telemetric signals; and
      increasing a bandwidth associated with monitoring the telemetric signals by:
         omitting one or more of the correlated telemetric signals from each of the clusters during sampling of the telemetric signals; and
         estimating the omitted correlated telemetric signals from the sampled telemetric signals.

2. The computer-implemented method of claim 1, wherein grouping the telemetry data into one or more clusters of correlated telemetric signals involves:
   identifying a cross-predictability measure associated with each telemetric signal from the telemetric signals using a cross-correlation analysis technique; and
   creating the clusters based on the cross-predictability measure.

3. The computer-implemented method of claim 2, wherein the cross-predictability measure corresponds to a prediction error associated with the telemetric signal.

4. The computer-implemented method of claim 3, wherein the telemetric signal is continuously sampled at a high sampling rate if the prediction error is high.

5. The computer-implemented method of claim 1, wherein the monitored system corresponds to a computer system.

6. The computer-implemented method of claim 5, wherein the telemetric signals from the computer system comprise at least one of:
   a load metric;
   a CPU utilization;
   an idle time;
   a memory utilization;
   a disk activity;
   a transaction latency;
   a temperature;
   a voltage;
   a fan speed; and
   a current.

7. The computer-implemented method of claim 1, wherein estimating the omitted correlated telemetric signals involves:
   applying a nonlinear, nonparametric regression technique to the sampled telemetric signals.

8. The computer-implemented method of claim 1, wherein the nonlinear, nonparametric regression technique corresponds to a multivariate state estimation technique (MSET).

9. A system for analyzing telemetry data from a monitored system, comprising:
   a monitoring mechanism configured to obtain the telemetry data as a set of telemetric signals from the monitored system;
   a cross-correlation apparatus configured to group the telemetry data into one or more clusters of correlated telemetric signals from the telemetric signals; and an analysis apparatus configured to increase a bandwidth associated with monitoring the telemetric signals by:
- omitting one or more of the correlated telemetric signals from each of the clusters during sampling of the telemetric signals by the monitoring mechanism; and
- estimating the omitted correlated telemetric signals from the sampled telemetric signals.

10. The system of claim 9, wherein grouping the telemetry data into one or more clusters of correlated telemetric signals involves:
- identifying a cross-predictability measure associated with each telemetric signal from the telemetric signals using a cross-correlation analysis technique; and
- creating the clusters based on the cross-predictability measure.

11. The system of claim 10, wherein the cross-predictability measure corresponds to a prediction error associated with the telemetric signal.

12. The system of claim 11, wherein the telemetric signal is continuously sampled at a high sampling rate if the prediction error is high.

13. The system of claim 9, wherein estimating the omitted correlated telemetric signals involves:
- applying a nonlinear, nonparametric regression technique to the sampled telemetric signals.

14. The system of claim 9, wherein the nonlinear, nonparametric regression technique corresponds to a multivariate state estimation technique (MSET).

15. A non-transitory computer-readable storage medium storing instructions that when executed by a computer cause the computer to perform a method for analyzing telemetry data from a monitored system, the method comprising:
- obtaining the telemetry data as a set of telemetric signals from the monitored system;
- grouping the telemetry data into one or more clusters of correlated telemetric signals from the telemetric signals; and
- increasing a bandwidth associated with monitoring the telemetric signals by:
  - omitting one or more of the correlated telemetric signals from each of the clusters during sampling of the telemetric signals; and
  - estimating the omitted correlated telemetric signals from the sampled telemetric signals.

16. The non-transitory computer-readable storage medium of claim 15, wherein grouping the telemetry data into one or more clusters of correlated telemetric signals involves:
- identifying a cross-predictability measure associated with each telemetric signal from the telemetric signals using a cross-correlation analysis technique; and
- creating the clusters based on the cross-predictability measure.

17. The non-transitory computer-readable storage medium of claim 16, wherein the cross-predictability measure corresponds to a prediction error associated with the telemetric signal.

18. The non-transitory computer-readable storage medium of claim 17, wherein the telemetric signal is continuously sampled at a high sampling rate if the prediction error is high.

19. The non-transitory computer-readable storage medium of claim 15, wherein estimating the omitted correlated telemetric signals involves:
- applying a nonlinear, nonparametric regression technique to the sampled telemetric signals.

20. The non-transitory computer-readable storage medium of claim 15, wherein the nonlinear, nonparametric regression technique corresponds to a multivariate state estimation technique (MSET).

* * * * *